J. I. MISENER, F. E. SKROBACK & W. S. SANDERS.
METAL CUTTING TOOL.
APPLICATION FILED FEB. 16, 1917.

1,283,258.

Patented Oct. 29, 1918.

John J. Misener
Frank E. Skroback
William S. Sanders
INVENTORS.

BY
Themselves
ATTORNEYS

UNITED STATES PATENT OFFICE.

JOHN I. MISENER, FRANK E. SKROBACK, AND WILLIAM S. SANDERS, OF SYRACUSE, NEW YORK, ASSIGNORS, BY DIRECT AND MESNE ASSIGNMENTS, TO MISENER & IRVING MANUFACTURING CO., INC., OF SYRACUSE, NEW YORK, A CORPORATION OF NEW YORK.

METAL-CUTTING TOOL.

1,283,258.      Specification of Letters Patent.      Patented Oct. 29, 1918.

Application filed February 16, 1917. Serial No. 148,973.

*To all whom it may concern:*

Be it known that we, JOHN I. MISENER, FRANK E. SKROBACK, and WILLIAM S. SANDERS, of Syracuse, in the county of Onondaga and State of New York, have invented a certain new and useful Metal-Cutting Tool, of which the following is a specification.

This invention has for its object a particularly simple and highly efficient metal cutting tool of which the following is a specification.

The object of this invention is to provide an inexpensive tool, which will readily cut circular holes of different diameters with the use of one cutting edge, and one that will make a central bearing and cut the circular hole in one operation. Other objects will appear throughout the specification.

In describing this invention, reference is had to the accompanying drawing in which like characters designate corresponding parts in all of the views.

This invention comprises generally a rotating head, circular grooves in the head concentric with the axis of rotation of the head and an arc-shaped hacksaw fixed in one of said grooves. It also preferably includes means extending axially from the head for forming a central bearing therefor.

This tool is particularly adapted for use with a hand-operated device as a hand drill or the like, but obviously is just as efficient when used with power-operated devices.

1 is the head which is provided with a part 2 for clamping it in a device for rotating the same.

Figure 1:
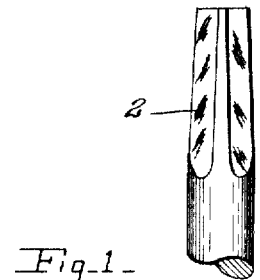
Figure 1 is a sectional view partly in elevation and partly broken away of this metal cutting tool.
Figure 2:
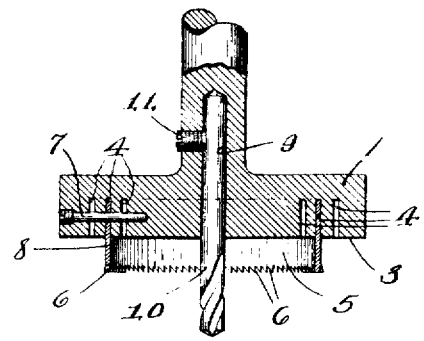
Fig. 2 is an inverted face view of the same.
Figure 2:
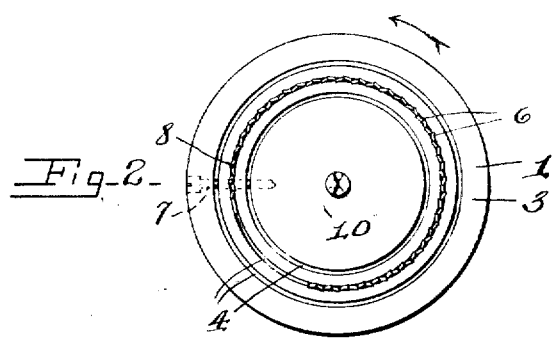

As illustrated in Fig. 2 the head 1 is preferably circular and is provided with a substantially flat face 3 disposed at a right angle to the axis of rotation of said head. Circular grooves 4 are formed in said flat face concentric with the axis of rotation of the head 1. The face 3 is for convenience and for brevity's sake referred to in the specification and claims as flat and preferably is flat.

The cutter 5 in the preferable form of this invention comprises a flat hacksaw or metal saw 5 formed in an arc with the usual teeth 6 set, as customary with saws of this character.

Figure 3:
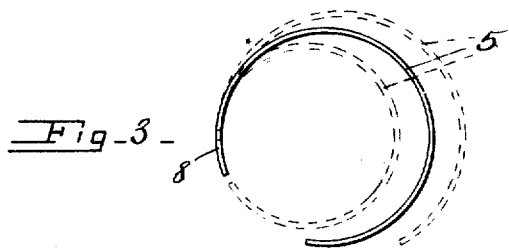
Fig. 3 is a diagrammatic view of the cutter for this tool. The expanded and contracted positions of the cutter being shown in dotted lines.

In the drawings, the head 1 is shown as provided with three circular grooves 4 and the saw blade 5 is bent to conform to the size of the intermediate groove and as illustrated in Fig. 3 can be expanded or contracted to conform to either of the other grooves.

Obviously, one saw blade can be used to cut circular holes of different diameters with one holder or head.

Instead of the blade being in the form of an arc, the ends could be fixed together, thus forming a ring of the saw blade, but for cheapness of construction, the ends are preferably separated.

In use the saw blade is sprung into one of the concentric grooves 4 and is held from movement relatively to the rotation of the head 1 by means of a pin 7 extending radially into the head 1 from the outer diameter thereof and passing through the grooves and through one end 8 of the saw blade.

The saw blade is preferably held from the front end thereof, as the grooves are made wide enough to readily admit the thickness of the saw and a saw blade held, as illustrated, readily conforms to the inner diameter of the grooves, which is the desired diameter, and being held from the front end also prevents the saw from buckling.

The grooves 4 are of a uniform depth and the saw blades are of a uniform width and when a blade is inserted in one of the grooves it is of sufficient width to extend beyond the flat face 3 thereof and the cutting surface thereof is parallel to said flat face.

The rotary head 1 is provided with means for forming a central bearing for the tool and as here shown, a passage 9 is formed therein and extends axially thereof from the flat face 3 through the head and into the part 2. A drill 10 is held in said passage 9, by a set screw 11, and the cutting surface of said drill extends beyond the flat face 3 of the head 1, and beyond the teeth 6 of the arc-shaped hacksaw.

In use, the operator first locates the center where the hole is to be cut and places the point of the drill 10 thereon; upon rotation of the head 1, the drill 10 cuts a small hole in the metal, which hole centers the arc-shaped hacksaw with respect to the hole to be cut and forms a central bearing for the tool.

Upon further rotation of the head, the teeth of the hacksaw come in contact with the surface to be cut and as arranged, present a large cutting face to said surface, thereby cutting through the same very rapidly.

A tool as described, is very simple in construction and inexpensive to manufacture and is highly efficient and durable in use.

What we claim is:

1. A metal cutting tool comprising a rotary head, having a flat face with a circular groove therein concentric with the axis of rotation thereof, and an arc-shaped hacksaw in said groove with the cutting edge thereof extending beyond and parallel with the flat face of the rotary head and a means at one end of the hacksaw for holding the same from rotative movement relatively to the head, substantially as and for the purpose set forth.

2. A metal cutting tool comprising a rotary head, having a flat face with a circular groove therein concentric with the axis of rotation thereof, an arc-shaped hacksaw fixed therein with its cutting edge extending beyond and parallel to the flat face thereof, and a part extending axially from the head for centering the tool, substantially as and for the purpose described.

3. A metal cutting tool comprising a rotary head, having a flat face with a circular groove therein concentric with the axis of rotation thereof, an arc-shaped hacksaw fixed therein at one end thereof with its cutting edge extending beyond and parallel to the flat face thereof, and a drill held concentric with said head for forming a central bearing therefor, substantially as and for the purpose specified.

4. A metal cutting tool comprising a rotary head, having a flat face with circular grooves therein concentric with the axis of rotation thereof, an arc-shaped hacksaw conforming to any of said grooves with the cutting edge extending beyond and parallel to the flat face of the head, and means at one end of said hacksaw for holding the same from rotative movement relative to the head, substantially as and for the purpose set forth.

5. A tool for cutting circular holes comprising a hacksaw, a head having means for bending and frictionally holding the saw in an arc and means for securing the saw to the head at one point near one end of the saw and holding the saw from relative endwise movement, the remainder of the saw being free to conform to the arc of the holding means, substantially as and for the purpose described.

6. A metal cutting tool for cutting circular holes comprising a rotary head, having a flat face with circular grooves therein concentric with the axis of rotation thereof, a hacksaw bent in the form of an arc, the hacksaw being of less thickness than the width of said grooves, and means at one end of said hacksaw for conforming the same to one side wall of any one of said grooves and holding it from rotative movement relatively thereto, substantially as and for the purpose specified.

7. A metal cutting tool for cutting circular holes comprising a rotary head, having a flat face with circular grooves therein concentric with the axis of rotation thereof, a hacksaw bent in the form of an arc, the hacksaw being of less thickness than the width of said grooves and means at the forward end of said hacksaw for conforming the same to the inner side wall of any one of said grooves and holding it from rotative movement relatively thereto, substantially as and for the purpose set forth.

8. A metal cutting tool for cutting circular holes comprising a rotary head, having a flat face with circular grooves therein concentric with the axis of rotation thereof, a hacksaw bent in the form of an arc, the hacksaw being of less thickness than the width of said grooves, and means, as a pin, extending radially into said rotary head through said grooves and through the forward end of said hacksaw for conforming the same to the inner side wall of any one of said grooves and holding it from rotative movement relatively thereto, substantially as and for the purpose described.

In testimony whereof, we have hereunto signed our names in the presence of two attesting witnesses, at Syracuse, in the county of Onondaga, in the State of New York, this 13th day of February, 1917.

JOHN I. MISENER.
FRANK E. SKROBACK.
WILLIAM S. SANDERS.

Witnesses:
CHAS. H. YOUNG,
JANE H. GLAZIER.